April 19, 1927.
E. T. CONANT ET AL
1,625,592
LIQUID MIXING APPARATUS
Filed Dec. 1, 1924
2 Sheets-Sheet 1
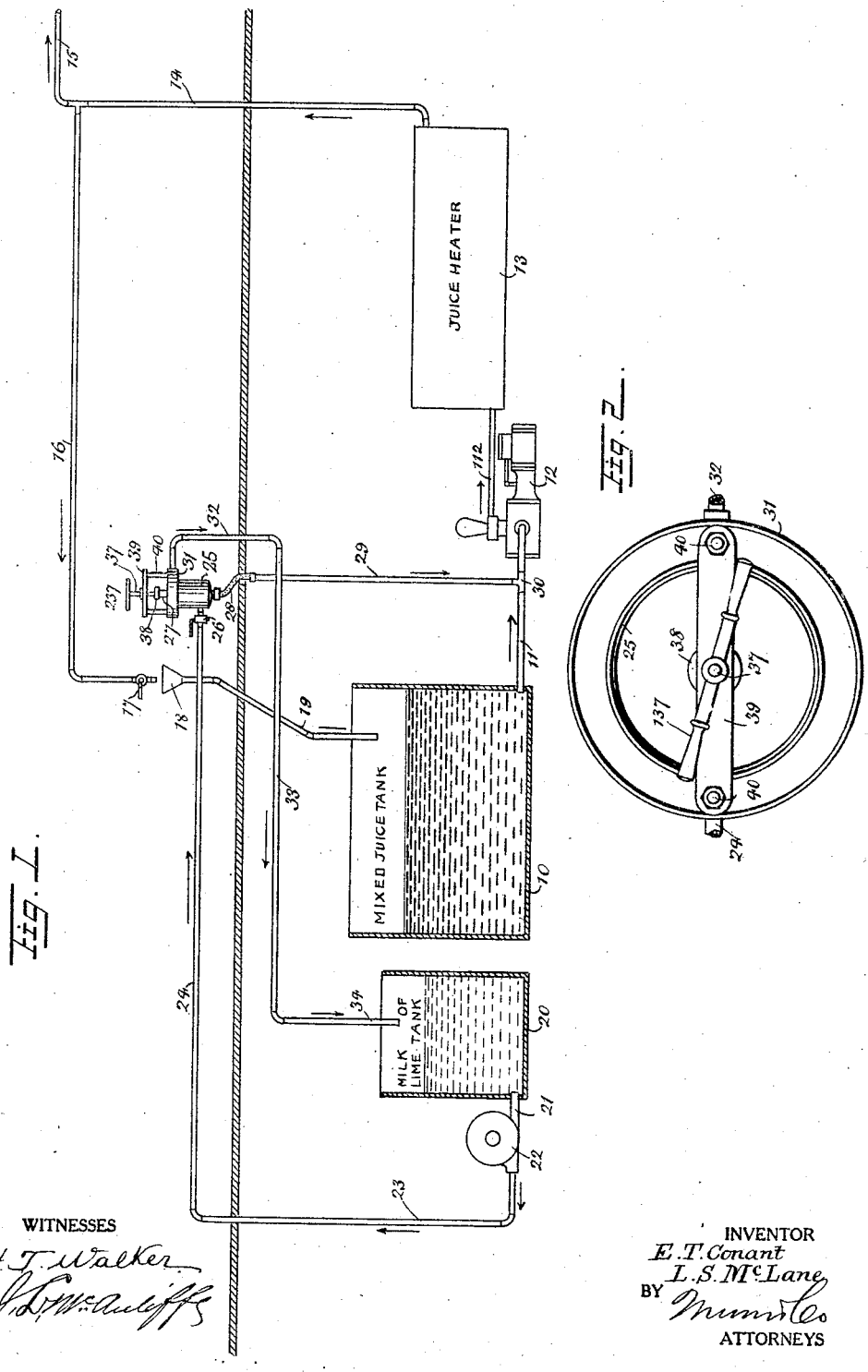
WITNESSES
INVENTOR
E. T. Conant
L. S. McLane
BY
ATTORNEYS April 19, 1927.
E. T. CONANT ET AL
1,625,592
LIQUID MIXING APPARATUS
Filed Dec. 1, 1924     2 Sheets-Sheet 2
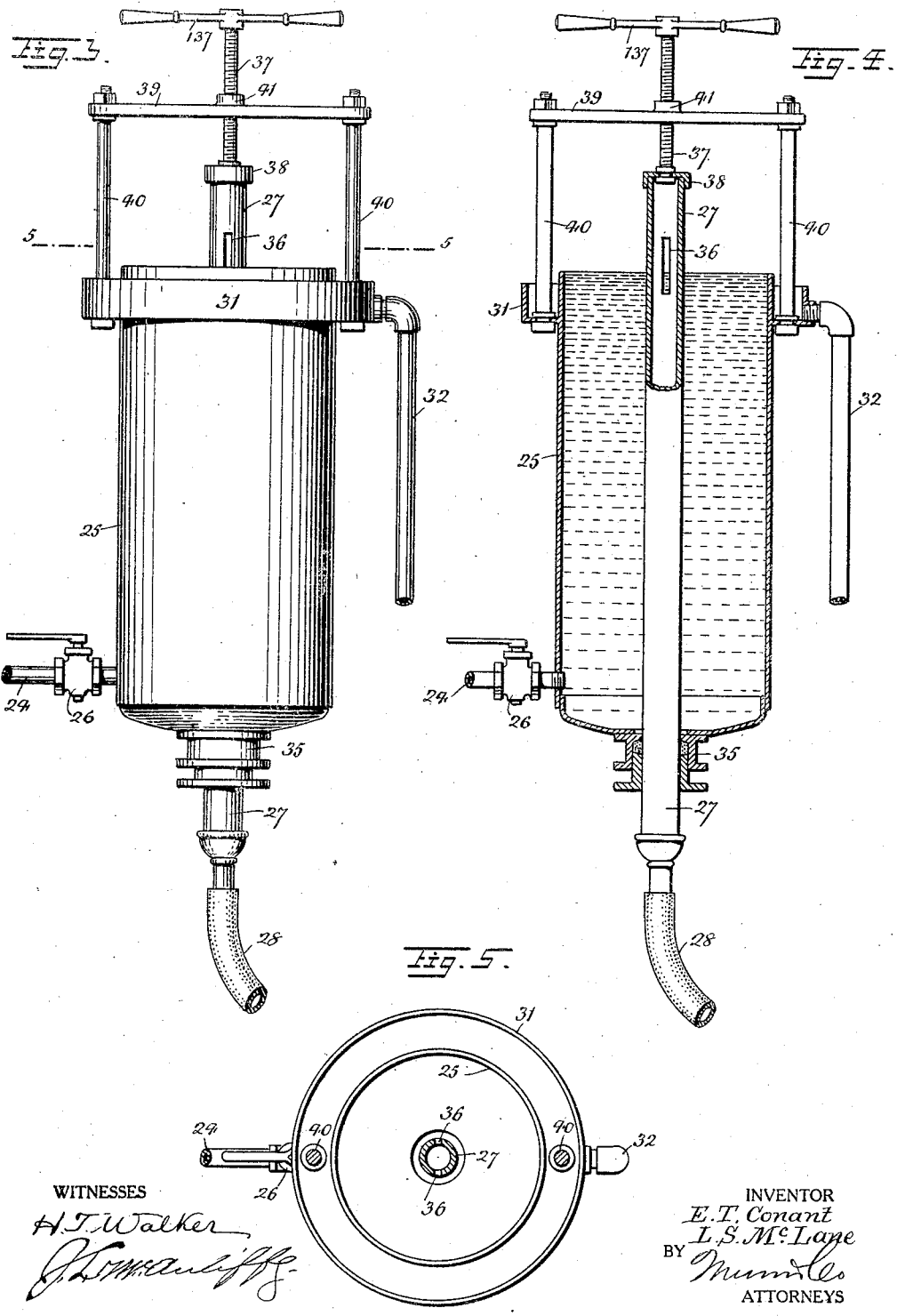
WITNESSES
INVENTOR
E.T. Conant
L.S. McLane
BY
ATTORNEYS Patented Apr. 19, 1927.

1,625,592

UNITED STATES PATENT OFFICE.

ELLSWORTH THOMAS CONANT AND LAURENCE SORENSON McLANE, OF HONOMU, TERRITORY OF HAWAII.

LIQUID-MIXING APPARATUS.

Application filed December 1, 1924. Serial No. 753,401.

Our invention is adapted to be used for the effective mixing generally of two liquids but has special usefulness as a means for mixing milk of lime with sugar juices, and the invention will be explained in its use as installed in a raw sugar plant.

A great difficulty is experienced in producing a perfect mixture of lime and sugar juices and it is the general object of our invention to provide means whereby a perfect or substantially perfect mixing of the lime and juice is brought about.

A further object of our invention is to provide a device for adding lime to juices or for other purposes in which one of the liquids to be mixed is maintained in a receptacle at a constant level or a nearly constant level regardless of slight changes in the rate of feed of the liquid to said vessel, and to provide for varying the outflow of the liquid from said vessel without affecting the liquid level in the vessel.

The manner and means whereby the above and other objects as will appear are attained will be readily understood as the description proceeds.

Reference is to be had to the accompanying drawings forming a part of this specification, it being understood that the drawings are merely illustrative of one example of the invention.

Figure 1 is a schematic view of a part of a sugar plant having our improved liming device installed therein;

Figure 2 is a plan view of the liming device;

Figure 3 is an elevation of the liming device;

Figure 4 is a transverse vertical section of the liming device;

Figure 5 is a horizontal section on the line 5—5, Figure 3.

In Figure 1 the liming device is shown coordinated with parts of a raw sugar plant. In said figure the numeral 10 indicates the mixed juice tank; 11, the outlet pipe from said tank connecting with the suction of the mixed juice pump 12, the discharge of which connects by a pipe 112 with the juice heater 13, the juices being forced through said heater and passing by pipes 14, 15 to settling tanks, not shown. A juice sampling by-pass pipe 16 taps the pipe 14 leading to the settling tanks, said sampling pipe 16 being shown with a shut-off valve 17 and a depending end thereon so that the juice from said sampling pipe may gravitate through funnel 18 on the upper end of a pipe 19 leading downwardly into the mixed juice tank 10. The numeral 20 indicates a tank for containing milk of lime and an outlet pipe 21 from said tank 20 leads to the suction of a lime pump 22, the lime being conducted from the pump 22 by pipes 23, 24 to our improved liming device designated generally by the numeral 25. The numeral 26 indicates a shut-off valve in the pipe 24.

The liming device 25 consists of a vessel constituting a container or receptacle for the milk of lime. The upper end of the container 25 is open. Disposed vertically and centrally in the container 25 and rising above the top of the same, is a pipe 27 which connects by a flexible pipe section 28 with a pipe 29, which pipe 29 connects as at 30 with the outlet pipe 11 from the mixed juice tank 10 between said tank 10 and the pump 12. The pipe 27 is vertically adjustable, the vertical movement of the pipe being permitted by the flexible hose section 28. Adjacent the upper end of the container 25 is an annular overflow channel 31 having a discharge pipe 32 leading therefrom, said pipe 32 connecting with pipe 33 having a depending end 34 leading into the milk of lime tank 20. Thus, the lime overflowing from the container 25 will be caught by the annular channel 31 and flow back to the tank 20. At the bottom of container 25 is a stuffing box 35 through which the pipe 27 passes.

For regulating the flow of the lime through pipe 27 to hose section 28 and pipe 29 to the circulating pipe 11, for causing the lime to mix with the juices from tank 10, said pipe 27 is formed with an opening or openings 36 two of which openings are shown in the illustrated example diametrically opposite. The slot 36 is at the liquid level or top of the container 25 and therefore the flow of the lime through the slots 36 to pipe 27 and thus to pipe 11 will depend on the height of the pipe 27 and the extent to which the slots 36 are submerged in the lime in the container 25.

Any suitable means may be provided for raising and lowering the pipe 27. In the illustrated example of the invention, a vertical screw 37 is swiveled at its lower end to the cap 38 of pipe 37 and passes through suitable framework which is shown as a cross bar 39 and supporting posts 40 rising from the bottom of the channel 31. The bar 39 has a central boss or thickened portion 41 internally threaded to engage the threads of the screw 37, said screw having a vertical cross handle 137 as in Figures 3 and 4 or a handwheel 237 as in Figure 1.

With the liming device 25 associated with part of the assemblage in Figure 1, for example, the pump 12 will draw the mixed juice from the tank 10, force it through the heater 13 and by pipes 14, 15 to the settling tanks. At the same time the valve 17 being open, juice will flow also through the by-pass pipe 16 and be delivered to the funnel 18 and pipe 19 to finally return to the tank 10. In practice, it is found that repeated samples taken from the by-pass 16 show a perfect mixture of the lime and juice. The flow of the milk of lime will be caused by pump 22 which draws the lime from the tank 20 and directs it to pipes 23, 24 to the liming device 25 where it flows continuously when the apparatus is in operation by pipe 29 to the pipe 11 and juice pump 12.

The liming device 25, it will be seen, constitutes a control and regulator for the flow of the liquid passing to and from said controlling device. The circulation of the milk of lime is continuous thus maintaining an even quality at all times.

It will be observed that with the provision of the channel 31, to take care of the overflow from the container 25, it is possible to maintain a very constant level in the container 25 since any slight variation in the feed of the lime to the container 25 will simply result in more or less of an overflow to the channel 31, the arrangement resulting in a uniform discharge determined by the vertical adjustment of the pipe 27 with its slots 36.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claims.

Having thus described our invention, we claim:

1. In an apparatus of the character described, a container having an open top to permit the free overflow of liquid therefrom, means to maintain a supply of liquid to the container and maintain a constant overflow, a discharge pipe from said container, said discharge pipe having a vertically disposed opening, and means to vertically adjust the discharge pipe to submerge more or less of said opening.

2. In an apparatus of the character described, an open top liquid tank, means for supplying liquid to said tank to maintain a constant overflow over the top of said tank, a cross head supported above the tank, an overflow pipe extending vertically within the tank said overflow pipe being vertically adjustable and having longitudinal openings adjacent its upper end, a screw threaded vertically through the cross-head, and connecting means between the screw and overflow pipe whereby said pipe may be adjustably raised or lowered.

3. A constant head maintaining device comprising an open top tank into which the liquid from a discharge pipe may empty, an outlet pipe for the said tank extending upwardly within the tank and having slots adjacent its upper end, means for adjusting the outlet pipe to arrange the slots thereof in relation to the top of the associated tank, and means whereby the liquid passing over the top of the said tank may be returned to the supply tank.

ELLSWORTH THOMAS CONANT.
LAURENCE SORENSON McLANE.